(12) United States Patent
Poelma et al.

(10) Patent No.: US 12,162,975 B2
(45) Date of Patent: Dec. 10, 2024

(54) BRANCHED REACTIVE BLOCKED PREPOLYMERS FOR ADDITIVE MANUFACTURING

(71) Applicant: Carbon, Inc., Redwood City, CA (US)

(72) Inventors: Justin Poelma, Sunnyvale, CA (US); R. Nicholas Carmean, Mountain View, CA (US); Matthew S. Menyo, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 580 days.

(21) Appl. No.: 17/051,815

(22) PCT Filed: Jul. 26, 2019

(86) PCT No.: PCT/US2019/043573
§ 371 (c)(1),
(2) Date: Oct. 30, 2020

(87) PCT Pub. No.: WO2020/023823
PCT Pub. Date: Jan. 30, 2020

(65) Prior Publication Data
US 2021/0238340 A1 Aug. 5, 2021

Related U.S. Application Data (60) Provisional application No. 62/711,072, filed on Jul. 27, 2018.

(51) Int. Cl.
| | |
|---|---|
| C08G 18/75 | (2006.01) |
| B33Y 10/00 | (2015.01) |
| B33Y 40/20 | (2020.01) |
| B33Y 70/00 | (2020.01) |
| B33Y 80/00 | (2015.01) |
| C08G 18/12 | (2006.01) |
| C08G 18/32 | (2006.01) |
| C08G 18/63 | (2006.01) |
| C08G 18/81 | (2006.01) |

(52) U.S. Cl.
CPC ............ *C08G 18/755* (2013.01); *B33Y 10/00* (2014.12); *B33Y 40/20* (2020.01); *B33Y 70/00* (2014.12); *B33Y 80/00* (2014.12); *C08G 18/12* (2013.01); *C08G 18/3206* (2013.01); *C08G 18/637* (2013.01); *C08G 18/8175* (2013.01)

(58) Field of Classification Search
CPC .................................................. C08G 18/755
See application file for complete search history.

(56) References Cited

U.S. PATENT DOCUMENTS

| | | |
|---|---|---|
| 3,213,058 A | 10/1965 | Boyle et al. |
| 4,159,376 A * | 6/1979 | Kuehn ................ C08F 20/36 |
| | | 526/261 |
| 4,785,075 A | 11/1988 | Shimp |
| 5,196,137 A | 3/1993 | Merchant |
| 5,236,637 A | 8/1993 | Hull |
| 5,391,072 A | 2/1995 | Lawton et al. |
| 5,506,007 A | 4/1996 | Williams et al. |
| 5,529,473 A | 6/1996 | Lawton et al. |
| 5,773,403 A | 6/1998 | Hijino et al. |
| 5,824,634 A | 10/1998 | Merchant |
| 6,008,179 A | 12/1999 | Flynn et al. |
| 6,288,018 B1 | 9/2001 | Flynn et al. |
| 6,426,327 B1 | 7/2002 | Flynn et al. |
| 6,646,020 B2 | 11/2003 | Nyberg et al. |
| 6,689,734 B2 | 2/2004 | Doyel et al. |
| 6,699,829 B2 | 3/2004 | Doyel et al. |
| 6,753,304 B1 | 6/2004 | Barthelemy et al. |
| 6,861,475 B2 | 3/2005 | Ilenda et al. |
| 6,916,867 B2 | 7/2005 | Gugumus |
| 7,157,586 B2 | 1/2007 | Wood et al. |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |

(Continued)

FOREIGN PATENT DOCUMENTS

| | | |
|---|---|---|
| CN | 104311783 A | 1/2015 |
| WO | 2015164234 A1 | 10/2015 |
| WO | 2016133759 A1 | 8/2016 |
| WO | 2016145182 A1 | 9/2016 |
| WO | 2018226943 A1 | 12/2018 |

OTHER PUBLICATIONS

International Search Report and Written Opinion corresponding to PCT/US2019/043573; dated Nov. 12, 2019 (8 pages).
Januszewicz, Rima, et al., "Layerless fabrication with continuous liquid interface production", PNAS, 113, 2016, 11703-11708.
Tumbleston, John R., et al., "Continuous liquid interface production of 3D Objects", Science, 347(6228), 2015, 1349-1352.

*Primary Examiner* — Vickey Nerangis
(74) *Attorney, Agent, or Firm* — Myers Bigel, P.A.

(57) ABSTRACT

Provided according to some embodiments is a polymerizable liquid useful for the production of a three-dimensional object comprised of polyurethane, polyurea, or a copolymer thereof by additive manufacturing, the polymerizable liquid comprising a mixture of: (a) a first blocked or reactive blocked prepolymer comprising a compound of the formula $X(A)_n$, where X is a hydrocarbyl group, n is at least 3, and each A is an independently selected substituent of Formula I: (I) where R is a hydrocarbyl group, R' is O or NH, and Z is a blocking group; (b) a polyol and/or polyamine chain extender; (c) optionally a reactive diluent; and (d) a photoinitiator. A method of use of the polymerizable liquid to make a three-dimensional object by additive manufacturing and prepolymer compounds useful for the same are also provided.

16 Claims, 3 Drawing Sheets

(56) References Cited

U.S. PATENT DOCUMENTS

| | | |
|---|---|---|
| 7,892,474 B2 | 2/2011 | Shkolnik et al. |
| 7,897,558 B1 | 3/2011 | Arafat |
| 8,088,245 B2 | 1/2012 | Lutz et al. |
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,598,606 B2 | 3/2017 | Rolland et al. |
| 9,676,963 B2 | 6/2017 | Rolland et al. |
| 11,713,395 B2 * | 8/2023 | Zhu .................. C08G 18/4854 264/496 |
| 2013/0292862 A1 | 11/2013 | Joyce |
| 2013/0295212 A1 | 11/2013 | Chen et al. |
| 2015/0184039 A1 | 7/2015 | Lutz et al. |
| 2015/0240113 A1 | 8/2015 | Pratt et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0120515 A1 | 5/2017 | Rolland et al. |
| 2017/0129167 A1 | 5/2017 | Castanon |
| 2017/0129169 A1 | 5/2017 | Batchelder et al. |
| 2017/0260418 A1 | 9/2017 | Wu et al. |
| 2018/0126630 A1 | 5/2018 | Panzer et al. |
| 2018/0243976 A1 | 8/2018 | Feller |
| 2018/0290374 A1 | 10/2018 | Willis et al. |

* cited by examiner

BRANCHED REACTIVE BLOCKED PREPOLYMERS FOR ADDITIVE MANUFACTURING

CROSS REFERENCE TO RELATED APPLICATIONS

This application is a 35 U.S.C. § 371 national phase application of International Application Serial No. PCT/US2019/043573, filed Jul. 26, 2019, which claims priority to U.S. Provisional Application Ser. No. 62/711,072, filed Jul. 27, 2018, the entire contents of which are hereby incorporated by reference.

FIELD OF THE INVENTION

The present invention concerns prepolymer compounds, resin formulations containing the same, and methods of use thereof in additive manufacturing (particularly stereolithography).

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and U.S. Pat. No. 9,216,546 to DeSimone et al.; J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606).

Among the dual cure resins described in Rolland et al., those employing reactive blocked polyurethane prepolymers are advantageous for a variety of uses, including for the production of rigid objects such as automobile and airplane trim and body parts. For such uses, however, ultraviolet (UV) light stability is also desired. Accordingly, there is a need for new dual cure resin formulations that can be used to produce objects exhibiting both rigidity and UV stability.

SUMMARY OF THE INVENTION

A first aspect of the invention is a polymerizable liquid useful for the production of a three-dimensional object comprised of polyurethane, polyurea, or a copolymer thereof by additive manufacturing, the polymerizable liquid comprising a mixture of:

(a) a first blocked or reactive blocked prepolymer comprising a compound of the formula $X(A)_n$, where X is a hydrocarbyl group, n is at least 3 (e.g., n is 3, 4, 5, or 6), and each A is an independently selected substituent of Formula I:

where R is a hydrocarbyl group, R' is O or NH, and Z is a blocking group;

(b) a polyol and/or polyamine chain extender;
(c) optionally a reactive diluent;
(d) a photoinitiator; and
(e) optionally a second blocked or reactive blocked prepolymer comprising a compound of the formula A'-X'-A', where X' is a hydrocarbyl group and each A' is an independently selected substituent of Formula I':

where R'' is a hydrocarbyl group, R''' is O or NH, and Z' is a blocking group, the blocking group optionally (but in some embodiments preferably) having a reactive epoxy, alkene, alkyne, or thiol terminal group.

In some embodiments, X is a branched alkyl group. In some embodiments, X is a mixed aliphatic and aromatic group containing N and O heteroatoms and carbonyl groups.

In some embodiments, Z' of Formula I' is the same as Z of Formula I; R'' of Formula I' is the same as R of Formula I; and/or R' of Formula I' is the same as R' of Formula I.

In some embodiments, the polymerizable liquid further comprises:

(f) a third blocked or reactive blocked prepolymer comprising a compound of the formula A''-X''-A'', or $X''(A'')_n$, wherein X'' is a hydrocarbyl group, n is at least 3, and each A'' is an independently selected substituent of Formula I'':

wherein Z'' is a blocking group, said blocking group optionally (but in some embodiments preferably) having a reactive epoxy, alkene, alkyne, or thiol terminal group.

In some embodiments, Z'' of Formula I'' is the same as Z' of Formula I' and/or Z of Formula I.

In some embodiments, the third blocked or reactive blocked prepolymer comprises a compound of the formula A''-X''-A'' and a compound of the formula $X''(A'')_n$.

A further aspect of the invention is a method of making a three-dimensional object, comprising:

(a) producing an intermediate object from a resin as described herein by additive manufacturing (e.g., by bottom-up stereolithography, such as by continuous liquid interface production);
(b) optionally cleaning the object (e.g., by washing, spinning, etc.); and then (c) heating and/or microwave irradiating the object for a time sufficient to further cure the object and form the three-dimensional object.

Objects so produced are also provided. Examples of objects that may be produced from the resins and by the methods described herein include, but are not limited to, automobile or airplane trim and body parts (e.g., external trim and body parts, or passenger compartment trim parts and panels, that are exposed to sunlight in ordinary use), helmets, eyeglass frames, building structural components (e.g., window frames), etc. Such objects may be rigid, flexible, or elastic, depending on the particular formulation of the resin.

Further provided is a prepolymer compound of the formula $X(A)_n$, wherein X is a hydrocarbyl group, n is at least 3 (e.g., n is 3, 4, 5, or 6), and each A is an independently selected substituent of Formula I:

(I)

wherein R is a hydrocarbyl group, R' is O or NH, and Z is a blocking group;
(b) a polyol and/or polyamine chain extender;
(c) optionally a reactive diluent; and
(d) a photoinitiator.

In some embodiments, the blocking group having a reactive epoxy, alkene, alkyne, or thiol terminal group.

In some embodiments, X is a branched alkyl group. In some embodiments, X is a mixed aliphatic and aromatic group containing N and O heteroatoms and carbonyl groups.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids (Resins).

Dual cure additive manufacturing resins are described in, for example, Rolland et al., U.S. Pat. Nos. 9,676,963; 9,598,606; and 9,453,142, and in Wu et al., US Patent Application Pub. No. US2017/0260418, the disclosures of which are incorporated herein by reference. Constituents of such resins may be used with the prepolymers of the present invention, or the prepolymers of the present invention may be added to such resins, as described further above and below.

Branched prepolymers. Branched prepolymers of the present invention are, in general, a blocked or reactive blocked prepolymer comprising a compound of the formula $X(A)_n$, wherein X is a hydrocarbyl group, n is at least 3, and each A is an independently selected substituent of Formula I:

(I)

where R is a hydrocarbyl group, R' is O or NH, and Z is a blocking group. Such groups R, R', and Z are described in Rolland et al., cited above, the disclosure of which is incorporated herein by reference.

"Hydrocarbyl" group as used herein refers to a bifunctional, trifunctional or higher functional hydrocarbon group, which hydrocarbon may be aliphatic, aromatic, or mixed aliphatic and aromatic, and optionally containing one or more (e.g. 1, 2, 3, or 4) heteroatoms (typically selected from N, O, and S). Such hydrocarbyl groups may be optionally substituted and may contain from 1, 2, or 3 carbon atoms, up to 6, 8 or 10 carbon atoms or more, and up to 40, 80, or 100 carbon atoms or more.

When the branched prepolymers are reactive blocked prepolymers, the blocking group preferably has a reactive epoxy, alkene, alkyne, or thiol terminal group.

In some embodiments, n is 3, 4, 5, or 6.

In some embodiments, X is a branched alkyl group. A non-limiting example of such compounds is a compound of the Formula:

In some embodiments, X is an aliphatic and/or aromatic group containing N and O heteroatoms and carbonyl groups. A non-limiting example of such compounds is a compound of the Formula:

wherein x=6 and y is about 10 to about 56.

Resins. In overview, in some embodiments, polymerizable liquids (or "resins") as described herein comprise a mixture of:

at least one blocked or reactive blocked branched prepolymer, and optionally at least one additional blocked or reactive blocked prepolymer (e.g., in a total or combined amount of from 5 to 90 percent by weight), at least one polyol and/or a polyamine chain extender (e.g., in an amount of from 5 to 90 percent by weight), a free radical photoinitiator (e.g., in an amount of from 0.1 to 4 percent by weight), optionally, but in some embodiments preferably, a reactive diluent (e.g., included in an amount of from 1 to 40 percent by weight when present);

optionally, but in some embodiments preferably, at least one non-reactive light absorbing pigment or dye (e.g., titanium dioxide, carbon black, and/or an organic ultraviolet light absorber) (e.g., in an amount of from 0.001 to 10 percent by weight, when present); and/or optionally, but in some embodiments preferably, a filler (e.g., in an amount of from 1 to 50 percent by weight, when present).

In some cases, the branched prepolymers are blocked with reactive blocking groups. In this situation, the resin may be comprised entirely of the branched prepolymers, or the resin may include additional prepolymers (e.g., linear, or difunctional, prepolymers), which additional prepolymers may be blocked with inert, or reactive, blocking groups ("inert" blocking groups including blocking groups that are volatile, and "gas out" during baking of the object). See, e.g., WO 2018/226943 to Chen et al., the disclosures of which are incorporated herein by reference.

In other cases, the branched prepolymers are blocked with inert (including volatile) blocking groups. In this situation, the resin preferably comprises at least one additional reactive blocked prepolymer (e.g., a linear or difunctional prepolymer), with the reactive blocked polymer being light-polymerized during the additive manufacturing step to form the intermediate object, and with the branched prepolymer then deblocking and polymerization during the subsequent heating or baking of the object to form the final polymer network in the finished object.

Details of the foregoing constituents are given in the references cited above, and in the additional description below.

Additional resin ingredients. The liquid resin or polymerizable material can have (among other things) solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS® 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (µm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257, and Kaneka Kane Ace MX 120 core-shell rubber dispersions, and mixtures thereof.

Organic diluents. In some embodiments, diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, N,N-dimethylacrylamide, N-vinyl-2-pyrrolidone, and N-vinyl formamide, or a mixture if two or more thereof. The diluent may be included in the polymerizable liquid in any suitable amount, typically from 1, 5 or 10 percent by weight, up to about 30 or 40 percent by weight, or more.

Accelerators. In some embodiments, the liquid may include a deoxygenating compound as an accelerator of stereolithography (particularly CLIP). An example of a suitable such accelerator is triphenylphosphine.

2. Production by Additive Manufacturing.

Polymerizable liquids or resins as described herein may be used to make three-dimensional objects, in a "light" cure (typically by additive manufacturing) which in some embodiments generates a "green" intermediate object, followed in some embodiments by a second (typically heat) cure of that intermediate object.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, U.S. Pat. Nos. 9,211,678; 9,205,601; 9,216,546, and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising a first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234), generating oxygen as an inhibitor by electrolysis (see I. Craven et al., WO 2016/133759), and incorporating magnetically positionable particles to which the photoactivator is coupled into the polymerizable liquid (see J. Rolland, WO 2016/145182).

Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, US Patent Application Pub. No. US 2017/0129167; B. Feller, US Pat App. Pub. No. US 2018/0243976; M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

After the intermediate three-dimensional object is formed, it is optionally cleaned (e.g., by wiping, blowing, spinning, washing, etc., including combinations thereof), optionally dried (e.g., air dried) and/or rinsed (in any sequence). It is then further cured, preferably by heating (although further curing may in some embodiments be concurrent with the first cure, or may be by different mechanisms such as contacting to water, as described in U.S. Pat. No. 9,453,142 to Rolland et al.).

3. Cleaning or Washing.

Objects as described above can be cleaned in any suitable apparatus, in some embodiments with a wash liquid as described above and below, and in other embodiments by wiping (with an absorbent, air blade, etc.) spinning, or variations thereof.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-pentafluoropropane, 1,1,1,3,3-pentafluorobutane, etc.

Examples of hydrochlorofluorocarbon solvents that may be used to carry out the present invention include, but are not limited to, 3,3-dichloro-1,1,1,2,2-pentafluoropropane, 1,3- dichloro-1,1,2,2,3-pentafluoropropane, 1,1-dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M) and Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

When the wash liquid includes ingredients that are not desired for carrying into the further curing step, in some embodiments the initial wash with the wash liquid can be followed with a further rinsing step with a rinse liquid, such as water (e.g., distilled and/or deionized water), or a mixture of water and an alcohol such as isopropanol.

4. Further Curing.

After washing, the object is in some embodiments further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road Round Lake, Illinois 60073-2898 USA, Davron Technologies, 4563 Pinnacle Lane, Chattanooga, TN 37415 USA, Despatch Thermal Processing Technology, 8860 207th Street, Minneapolis, MN 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

EXAMPLES

The present invention is explained in greater detail in the following non-limiting Examples, where the following abbreviations are used:

ABPU: Reactive blocked (e.g., acrylate blocked) polyurethane prepolymer

HDI: hexamethylene diisocyanate

THDI: HDI trimer (Evonik 3300A)

IPDI: isophorone diisocyanate (Covestro Desmodur I)

TIPDI: IPDI trimer (Vestant T 1890/100)

PTMO: poly(tetramethylene oxide) diol (MW=2900 Da)

TMP: trimethylolpropane

TBAEMA: 2-(tert-butylamino)ethyl methacrylate

MACM: 4,4'-methylenebis(2-methylcyclohexyl-amine) (a chain extender)

EGDMA: ethylene glycol dimethacrylate (a reactive diluent)

TPO: Diphenyl(2,4,6-trimethylbenzoyl)phosphine oxide (a photoinitiator)

CLIP: Continuous liquid interface production

Example 1

Synthesis of a Branched ABPU by the Addition of a Triol

Isophorone diisocyanate (IPDI) and catalyst (K-KAT 6212) were charged to a round-bottom reactor equipped with a heating mantel and overhead stirrer. The diisocyanate and catalyst solution were then heated to 70° C. while stirring.

Molten trimethylolpropane (TMP) and PTMO (2.9 kg/mol) were added to a preheated addition funnel to prevent crystallization. The PTMO and TMP were then added dropwise to a round-bottom reactor containing isophorone diisocyanate (IPDI) and catalyst (K-KAT 6212 or K-KAT 651) over 1.5 hours and allowed to react for 4 hours or until no further change in the isocyanate absorbance was detected by FT-IR. The reaction temperature was then lowered to 50° C. followed by the dropwise addition of TBAEMA to produce a branched ABPU.

| component | molar mass | mass | mol OH | mol NCO | mol NH2 | wt % |
|---|---|---|---|---|---|---|
| TMP | 134.2 | 16.00 | 0.358 | | | 0.800% |
| PTMO | 2900 | 684.44 | 0.472 | | | 34.222% |
| IPDI | 222.3 | 529.65 | | 4.765 | | 26.483% |
| TBAEMA | 185.3 | 765.716 | | | 4.132 | 38.286% |
| KKAT 6212 | | 3.6897525 | | | | 0.184% |
| total mass | | 1999.989 | | | | |

The foregoing may be represented by the following schemes:

and then:

TBAEMA

-continued where the above represents a distribution of high and low molecular weight blocked isocyanate prepolymers with a reactive end group functionality greater than 2, and up to 3.

Figure 1:
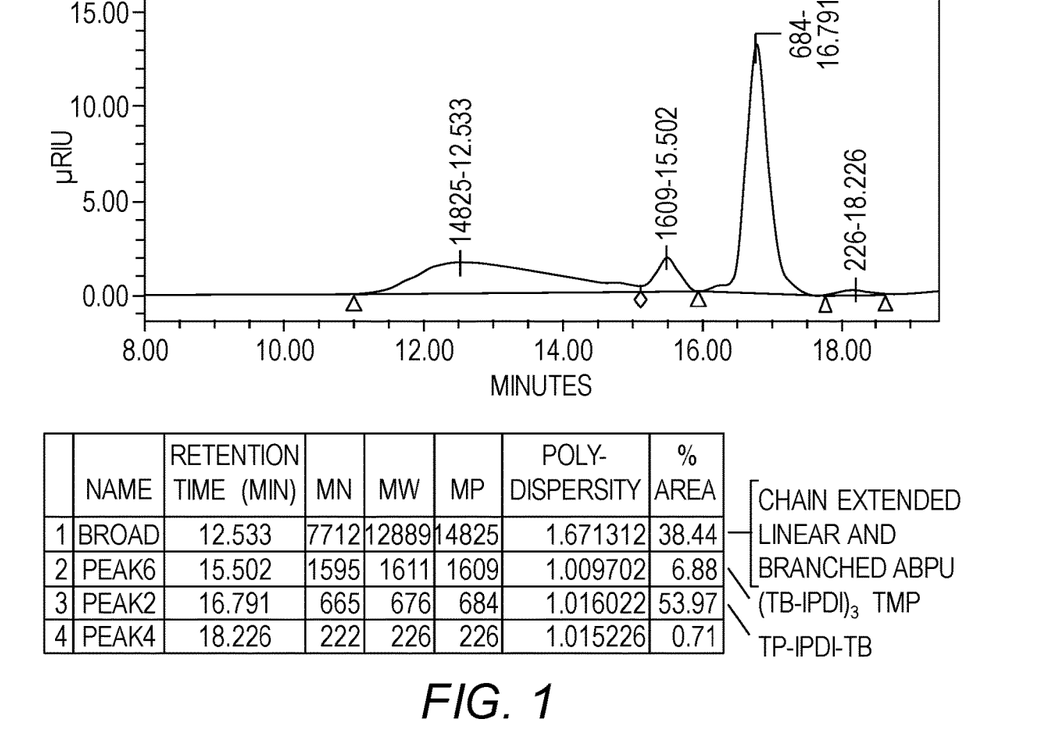
FIG. 1 is a gel permeation chromatography (GPC) trace showing high molecular weight products in addition to monodisperse low molecular weight products upon synthesis of a branched ABPU by the addition of a triol as described in Example 1.

Note also that the above structures are idealized. A person skilled in the art would recognize that distribution of products would be obtained including TMP-dimers, chain extended branched polymers, low molecular weight difunctional and trifunctional products, etc. The GPC trace provided in FIG. 1 shows higher molecular weight products in addition to monodisperse low MW products.

Example 2

Dual Cure Resin Formulation and Use in Additive Manufacturing

The mixture of ABPUs (including TMP-ABPU) described in Example 1 above is blended with EGDMA (or other reactive diluent), MACM (or other polyamine and/or polyol chain extender), and TPO (or other photoinitiator) as set forth in Table 1 below to yield a dual-cure photopolymer resin. The resin is the printed by CLIP (or other additive manufacturing process) to yield a three-dimensional part followed by baking for 12 h at 140° C. to obtain the final properties.

TABLE 1

| | Parts by weight |
|---|---|
| TMP-ABPU | 70 |
| EGDMA | 7 |
| MACM | 18 |
| TPO | 5 |
| Tensile Strength (MPa) | 30 |
| % Elongation at Break | 90 |

Example 3

Synthesis of a Branched ABPU with a Triisocyanate

Figure 2:
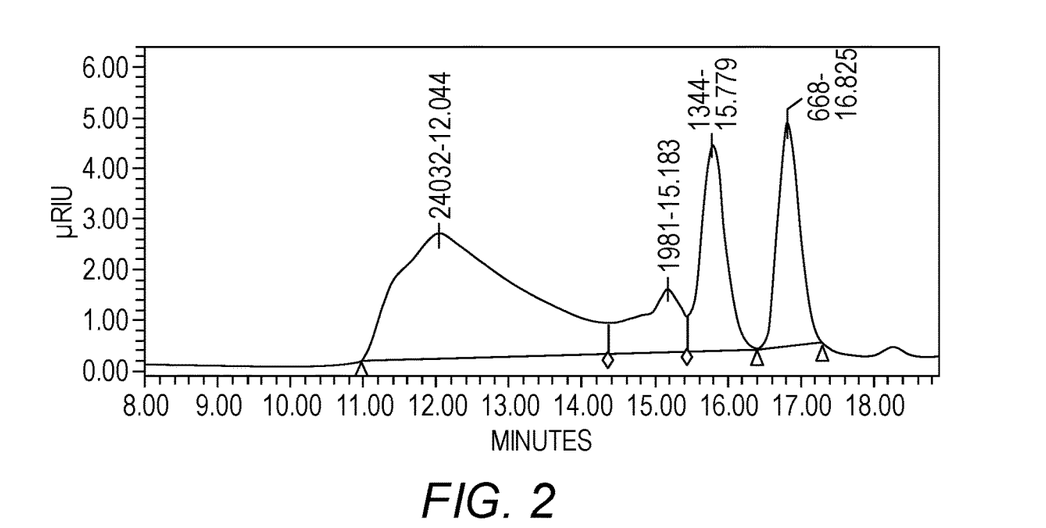
FIG. 2 is a GPC trace showing high molecular weight products in addition to monodisperse low molecular weight products upon synthesis of a branched ABPU with a triisocyanate as described in Example 3.

THDI (5.05 molar eq), IPDI (2.95 molar eq), and KKAT 6212 (0.5 wt % relative to PTMO) were charged to a reactor and heated to 70° C. with overhead stirring. PTMO (1.00 molar eq) was then added dropwise to the mixture and isocyanate conversion was determined with infrared spectroscopy. Upon full conversion of the PTMO diol, the reactor temperature was reduced to 50° C. and MEHQ (0.07 wt % relative to TBAEMA) was added to the reactor. TBAEMA (19.0 molar eq) was added dropwise and the reaction solution was stirred until no residual isocyanate was detected by infrared spectroscopy (FIG. 2).

The foregoing may be represented by the following schemes:

wherein x=6 and y is about 10 to about 56.

Example 4

Synthesis of a Branched ABPU

Figure 3:
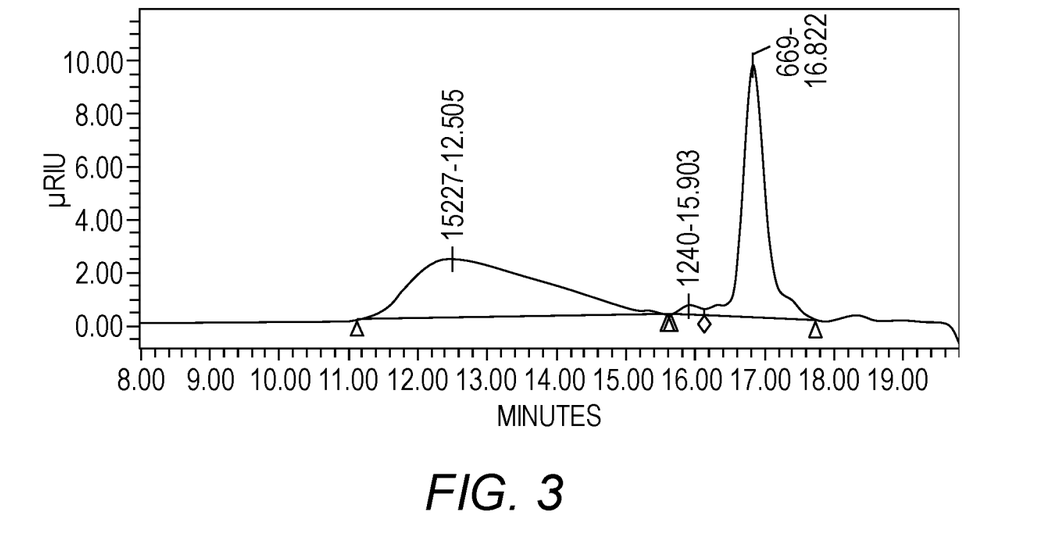
FIG. 3 is a GPC trace showing high molecular weight products in addition to monodisperse low molecular weight products upon synthesis of a branched ABPU as described in Example 4.

TIPDI (0.150 molar eq), IPDI (5.50 molar eq), and KKAT 6212 (0.5 wt % relative to PTMO) were charged to a reactor and heated to 70° C. with overhead stirring. PTMO (1.00 molar eq) was then added dropwise to the mixture and isocyanate conversion was determined with infrared spectroscopy. Upon full conversion of the PTMO diol, the reactor temperature was reduced to 50° C. and MEHQ (0.07 wt % relative to TBAEMA) was added to the reactor. TBAEMA (9.50 molar eq) was added dropwise and the reaction solution was stirred until no residual isocyanate was detected by infrared spectroscopy (FIG. 3).

Example 5

Synthesis of a Branched ABPU

Figure 4:
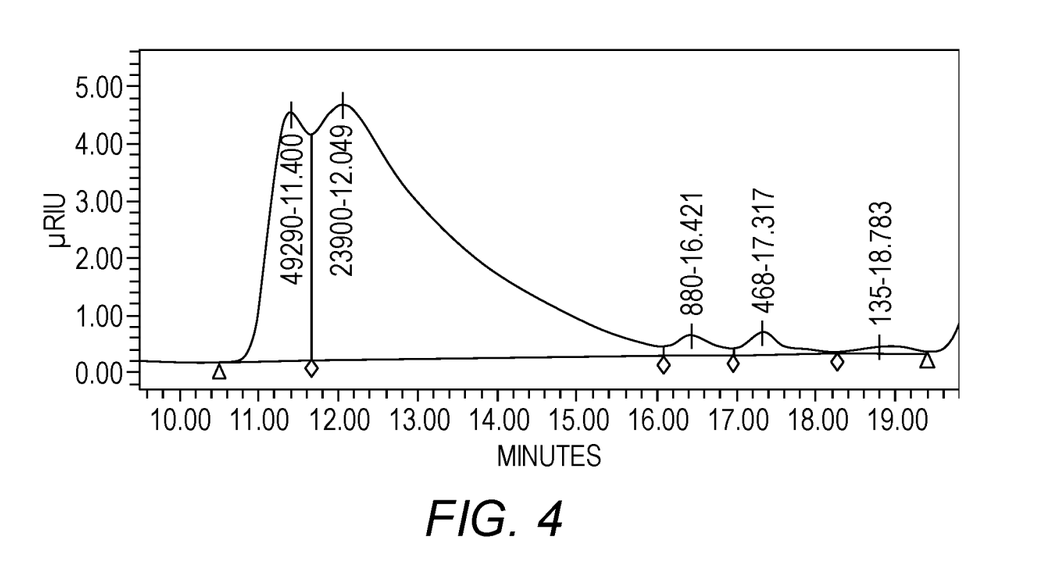
FIG. 4 is a GPC trace showing high molecular weight products in addition to monodisperse low molecular weight products upon synthesis of a branched ABPU as described in Example 5.

PTMO (1.00 molar eq), and KKAT 6216 (0.5 wt % relative to PTMO) were charged to a reactor and heated to 70° C. THDI (0.150 molar eq) was added dropwise and isocyanate conversion was determined with infrared spectroscopy. Upon full isocyanate conversion, the reactor was cooled to 40° C. IPDI (9.20 molar eq) was flushed into the reactor and the reactor was then heated to 70° C. Isocyanate conversion was determined with infrared spectroscopy and upon full conversion to PTMO the reactor was cooled to 50° C. TBAEMA (16.9 molar eq) and MEHQ (0.07 wt % relative to TBAEMA) were added dropwise and the reaction solution was stirred until no residual isocyanate was detected by infrared spectroscopy (FIG. 4).

Example 6

Synthesis of a Branched ABPU

Figure 5:
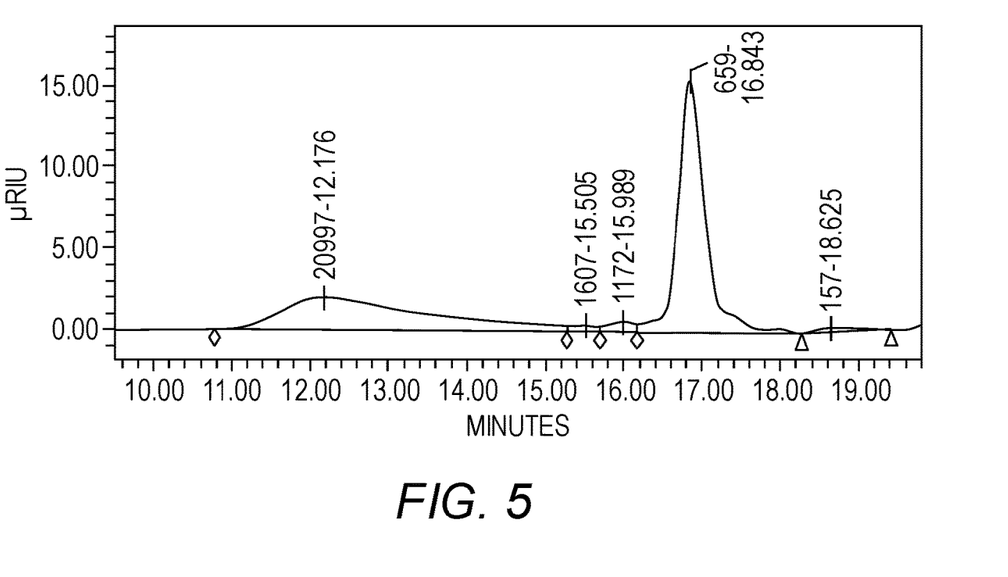
FIG. 5 is a GPC trace showing high molecular weight products in addition to monodisperse low molecular weight products upon synthesis of a branched ABPU as described in Example 6.

IPDI (3.12 molar eq), and KKAT 6212 (0.5 wt % relative to PTMO) were charged to a reactor and heated to 70° C. with overhead stirring. PTMO (1.00 molar eq) was then added dropwise to the mixture and isocyanate conversion was determined with infrared spectroscopy. Upon full conversion of PTMO, TMP (0.5 molar eq) was then added dropwise to the reactor and isocyanate conversion was determined with infrared spectroscopy. Upon full conversion of TMP the reactor was cooled to 50° C. IPDI (7.16 molar eq) was flushed into the reactor and MEHQ (0.07 wt % relative to TBAEMA) was added to the reactor. TBAEMA (17.0 molar eq) and was added dropwise and the reaction solution was stirred until no residual isocyanate was detected by infrared spectroscopy (FIG. 5).

Example 7

Synthesis of a Branched ABPU

Figure 6:
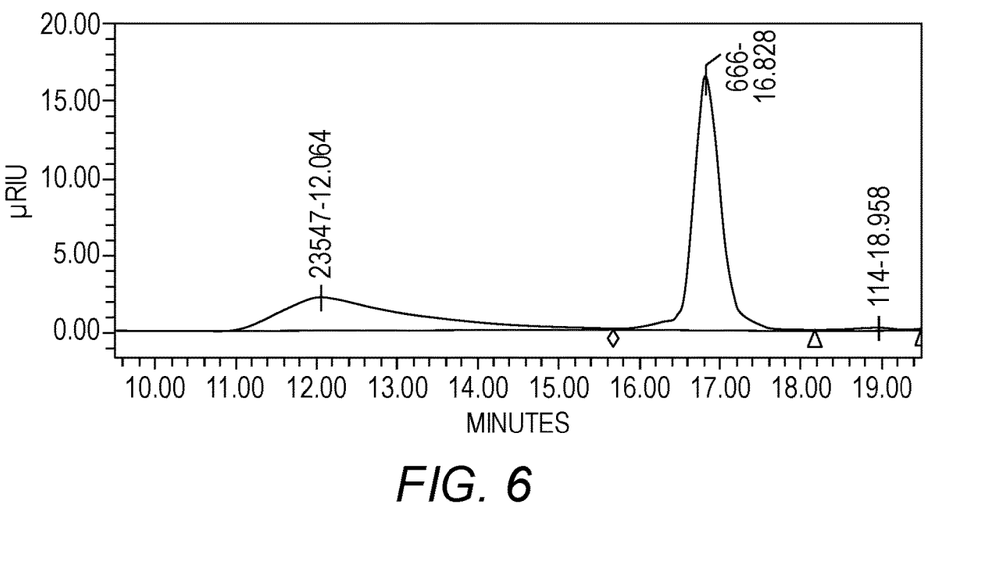
FIG. 6 is a GPC trace showing high molecular weight products in addition to monodisperse low molecular weight products upon synthesis of a branched ABPU as described in Example 7.

IPDI (2.10 molar eq), and KKAT 6212 (0.5 wt % relative to PTMO) were charged to a reactor and heated to 70° C. with overhead stirring. PTMO (1.00 molar eq) was then added dropwise to the mixture and isocyanate conversion was determined with infrared spectroscopy. Upon full conversion of PTMO, TMP (0.0912 molar eq) was then added dropwise to the reactor and isocyanate conversion was determined with infrared spectroscopy. Upon full conversion of TMP the reactor was cooled to 50° C. IPDI (7.82 molar eq) was flushed into the reactor and MEHQ (0.07 wt % relative to TBAEMA) was added to the reactor. TBAEMA (17.6 molar eq) and was added dropwise and the reaction solution was stirred until no residual isocyanate was detected by infrared spectroscopy (FIG. 6).

Example 8

Polyurea/Urethane Object Produced by Additive Manufacturing from a Branched ABPU Components as shown in Table 1, except MACM, were added to a container and thoroughly mixed (either by an overhead stirrer or THINKY™ blender) to obtain a homogeneous resin. Then MACM was added to the resin and mixed for another 5 min. The resin was printed by CLIP into dog-bone-shaped specimens followed by thermal curing at 140° C. for 12 h. The cured specimens were tested following ASTM standard on an Instron with an extensometer for mechanical properties, which were also summarized in Table 2.

TABLE 2

|  | Parts by weight |
| --- | --- |
| TMP ABPU from example 1 | 745 |
| Ethylene glycol dimethacrylate | 525 |
| MACM | 189 |
| TPO | 10 |
| Tensile Modulus (MPa) | 950 |
| % Elongation at Break | 110 |

The foregoing is illustrative of the present invention, and is not to be construed as limiting thereof. The invention is defined by the following claims, with equivalents of the claims to be included therein.

We claim:

1. A polymerizable liquid useful for the production of a three-dimensional object comprised of polyurethane, polyurea, or a copolymer thereof by additive manufacturing, said polymerizable liquid comprising a mixture of:
   (a) a first blocked or reactive blocked prepolymer comprising a compound of the formula $X(A)_n$, wherein X is an aliphatic and/or aromatic group containing N and O heteroatoms and carbonyl groups, n is at least 3, and each A is an independently selected substituent of Formula I:

(I)

wherein R is a hydrocarbyl group, R' is O or NH, and Z is a blocking group;
   (b) a polyol and/or polyamine chain extender;
   (c) optionally a reactive diluent; and
   (d) a photoinitiator.

2. The polymerizable liquid of claim 1, said blocking group having a reactive epoxy, alkene, alkyne, or thiol terminal group.

3. The polymerizable liquid of claim 1, wherein n is 3, 4, 5, or 6.

4. The polymerizable liquid of claim 1, wherein the aliphatic portion of X comprises a branched alkyl group.

5. The polymerizable liquid of claim 1, wherein said first blocked or reactive blocked prepolymer comprises a compound having the structure:

wherein x=6 and y is an integer of from 10 to 56.

6. The polymerizable liquid of claim 1, further comprising:
   (e) a second blocked or reactive blocked prepolymer comprising a compound of the formula A'-X'-A', where X' is a hydrocarbyl group and each A' is an independently selected substituent of Formula I':

(I')

wherein R'' is a hydrocarbyl group, R''' is O or NH, and Z' is a blocking group, said blocking group optionally having a reactive epoxy, alkene, alkyne, or thiol terminal group.

7. The polymerizable liquid of claim 6, further comprising:
   (f) a third blocked or reactive blocked prepolymer comprising a compound of the formula A''-X''-A'', or $X''(A'')_n$, wherein X'' is a hydrocarbyl group, n is at least 3, and each A'' is an independently selected substituent of Formula I'':

(I'')

wherein Z'' is a blocking group, said blocking group optionally having a reactive epoxy, alkene, alkyne, or thiol terminal group.

8. The polymerizable liquid of claim 7, wherein the third blocked or reactive blocked prepolymer comprises a compound of the formula A''-X''-A'' and a compound of the formula $X''(A'')_n$.

9. The polymerizable liquid of claim 1, wherein said chain extender comprises 4,4'-methylenebis(2-methylcyclohexylamine) (MACM).

10. The polymerizable liquid of claim 1, wherein said reactive diluent is present and comprises EGDMA: ethylene glycol dimethacrylate (EGDMA).

11. The polymerizable liquid of claim 1, further comprising a filler.

12. The polymerizable liquid of claim 1, further comprising a light-absorbing pigment or dye.

13. A method of making a three-dimensional object, comprising:
   (a) producing an intermediate object from the polymerizable liquid of claim 1 by additive manufacturing;
   (b) optionally cleaning said intermediate object; and then
   (c) heating and/or microwave irradiating said intermediate object for a time sufficient to further cure said intermediate object and form said three-dimensional object.

14. The method of claim 13, wherein said three-dimensional object comprises an automobile or airplane trim or body part, a helmet, an eyeglass frame, or a building structural component.

15. A three-dimensional object produced by a method comprising:
   (a) producing an intermediate object from a polymerizable liquid by additive manufacturing, said polymerizable liquid comprising a mixture of:
      (i) a first blocked or reactive blocked prepolymer comprising a compound of the formula $X(A)_n$, wherein X is an aliphatic and/or aromatic group containing N and O heteroatoms and carbonyl groups, n is at least 3, and each A is an independently selected substituent of Formula I:

wherein R is a hydrocarbyl group, R' is O or NH, and Z is a blocking group;
      (ii) a polyol and/or polyamine chain extender;
      (iii) optionally a reactive diluent; and
      (iv) a photoinitiator;
   (b) optionally cleaning said intermediate object; and then
   (c) heating and/or microwave irradiating said intermediate object for a time sufficient to further cure said intermediate object and form said three-dimensional object.

16. A polymerizable liquid useful for the production of a three-dimensional object comprised of polyurethane, polyurea, or a copolymer thereof by additive manufacturing, said polymerizable liquid comprising a mixture of:
   (a) a first blocked or reactive blocked prepolymer comprising a compound of the formula $X(A)_n$, wherein X is a hydrocarbyl group, n is at least 3, and each A is an independently selected substituent of Formula I:

wherein R is a hydrocarbyl group, R' is O or NH, and Z is a blocking group;
   (b) a polyol and/or polyamine chain extender;
   (c) optionally a reactive diluent; and
   (d) a photoinitiator;
   (e) a second blocked or reactive blocked prepolymer comprising a compound of the formula A'-X'-A', where X' is a hydrocarbyl group and each A' is an independently selected substituent of Formula I':

wherein R" is a hydrocarbyl group, R'" is O or NH, and Z' is a blocking group, said blocking group optionally having a reactive epoxy, alkene, alkyne, or thiol terminal group; and
   (f) a third blocked or reactive blocked prepolymer, wherein the third blocked or reactive blocked prepolymer comprises the compounds:

wherein x=6.

* * * * *